Jan. 6, 1970  E. DOAK  3,488,477
WAGE CALCULATOR
Filed Feb. 5, 1968  4 Sheets-Sheet 1
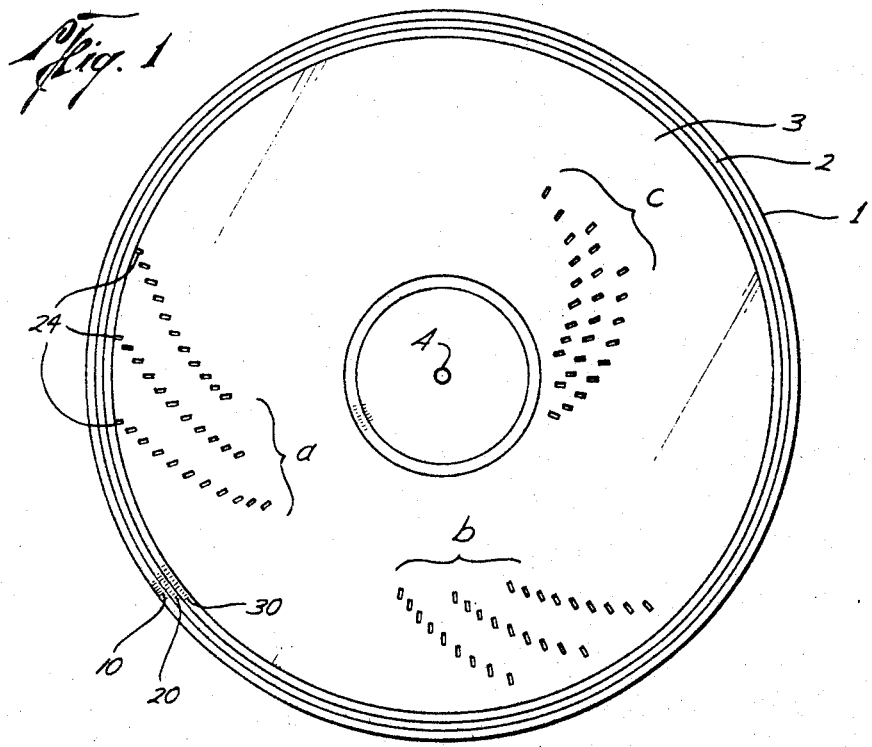
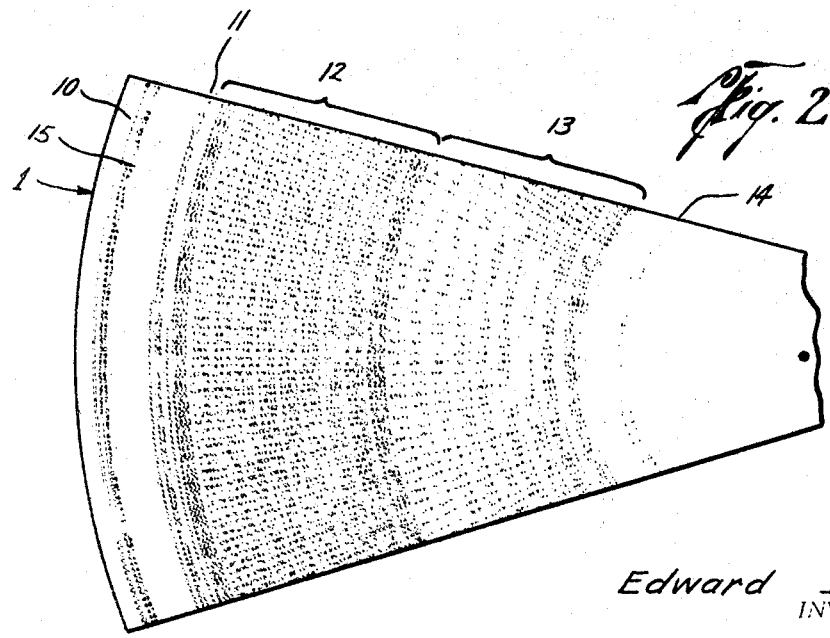
Edward Doak
INVENTOR.
BY
Bill B. Berryhill
ATTORNEY

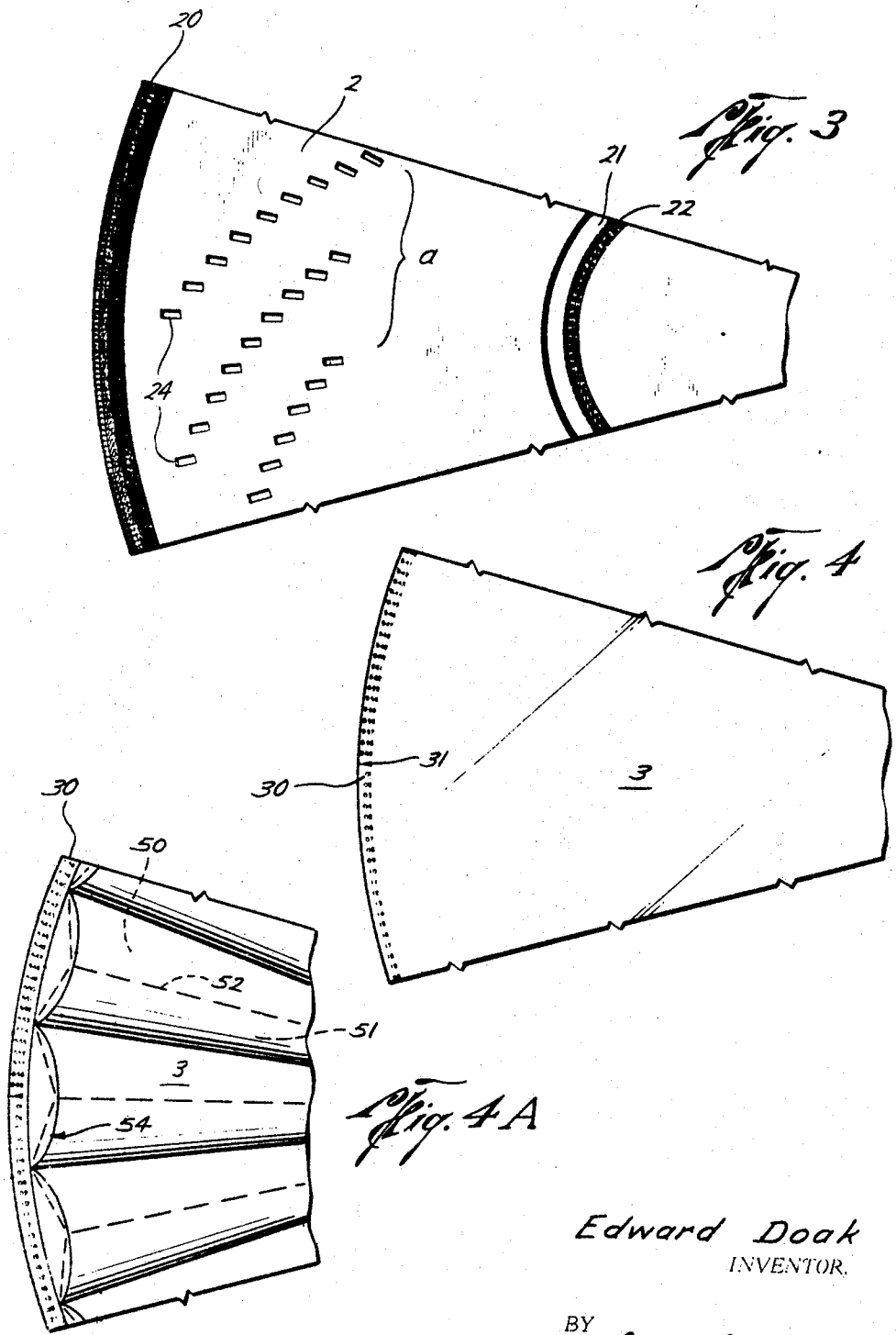

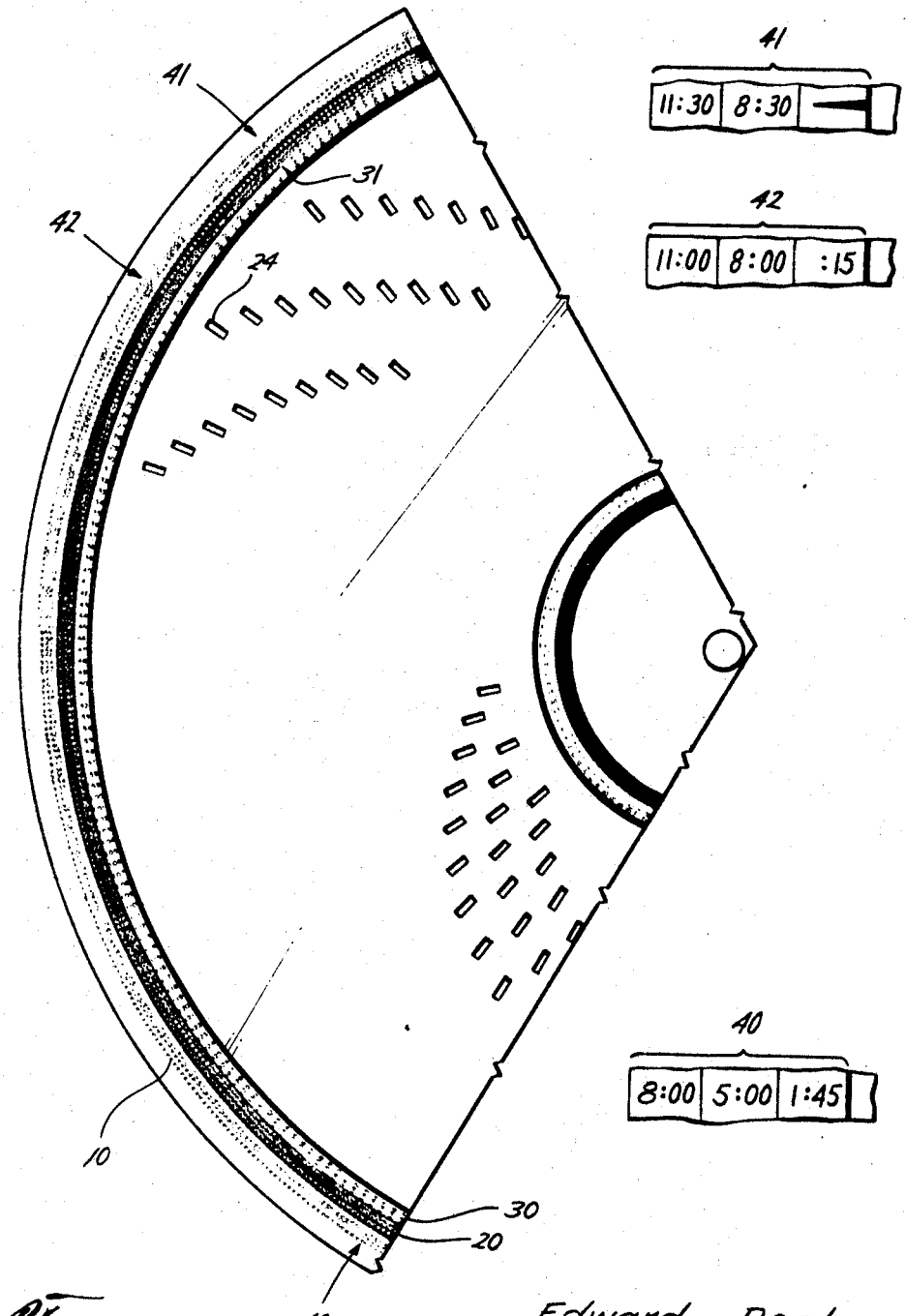

Jan. 6, 1970
E. DOAK
3,488,477
WAGE CALCULATOR
Filed Feb. 5, 1968
4 Sheets-Sheet 4
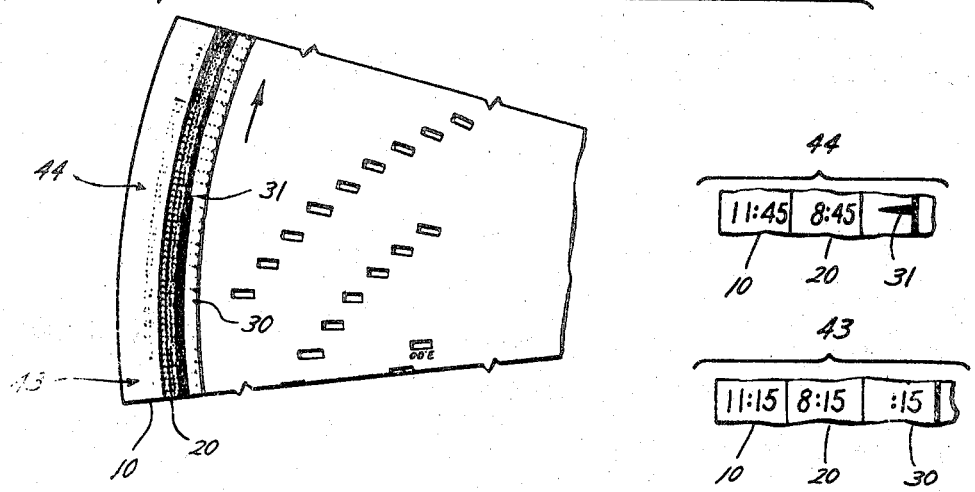
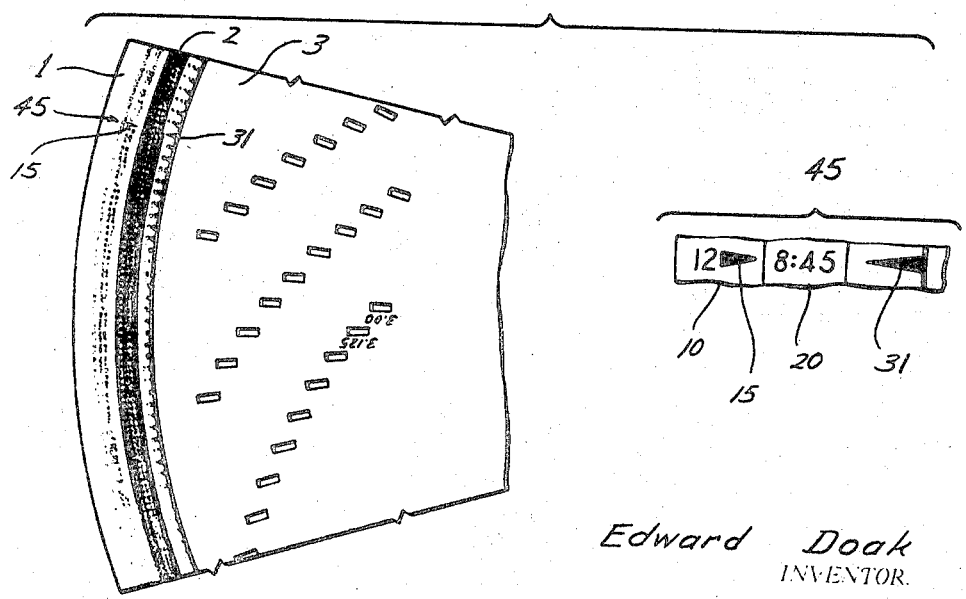
Edward Doak
INVENTOR.
BY
Bill B. Berryhill
ATTORNEY United States Patent Office 3,488,477
Patented Jan. 6, 1970

3,488,477
WAGE CALCULATOR
Edward Doak, Houston, Tex., assignor to Calrad, Inc., Houston, Tex., a corporation of Texas
Filed Feb. 5, 1968, Ser. No. 702,861
Int. Cl. G06c 3/00
U.S. Cl. 235—88
7 Claims

ABSTRACT OF THE DISCLOSURE

A calculator for the computing wages comprises three concentrically mounted plates of different diameters. The largest plate has a 12 hour scale graduated in minutes on its outer periphery. Within this outer circle in decreasing diameters is a number of circular scales each representing a particular wage rate times hours and minutes of labor. An inner scale of the smallest diameter is also a 12 hour scale but graduated in hours and tenths of an hour. An intermediate size opaque plate overlies the lower plate and also has on its periphery a 12 hour scale graduated in hours and minutes. Small rectangular windows are cut within the intermediate plate at various diameters and attitudes to correspond with a particular wage rate multiplied by labor time on the lower plate when starting time on the lower plate outer scale and quitting time on the intermediate plate outer scale are aligned. A transparent ring is provided near the center of the intermediate plate to register with the inner scale of the lower plate and an inner scale, also graduated in hours and tenths of an hour, is provided on the intermediate plate adjacent the inner scale of the lower plate. The smallest diameter plate which overlies the lower and intermediate plate is transparent except for a small ring around its outer edge which is a scale graduated in hours and minutes from zero to six hours.

BACKGROUND OF THE INVENTION

Field of the invention

This invention is related to calculator devices. In particular, it is concerned with a device for computing the wage of a laborer for varying hours of labor and various hourly rates.

Description of the prior art

Normally, laborers in factories, plants and the like, who are paid on an hourly rate basis, punch a card at a time clock on arriving at work and when leaving. Usually a time clerk receives these cards and makes a record of the time worked. It is then necessary to compute the wage due the laborer. This is sometimes quiet time consuming and occasionally productive of errors resulting, of course, in increased expenses and damaged labor relations. It is especially difficult to make accurate calculations when time is kept by the normal hours and minutes since most calculating machines and other devices are set up for decimal numbers. The calculation of overtime pay by conventional means is also somewhat tedious and suspectible to errors.

SUMMARY OF THE INVENTION

The present invention provides a simple hand operated computing device for calculating wages at various rates and working hours. The device comprises three circular plates of decreasing diameters overlying one another and independently rotatable about a common axis. By aligning the starting time on an outer scale of the lower plate with the quitting time on an outer scale of the intermediate plate one can immediately read the number of hours and minutes worked, through a window in the intermediate plate. By looking at other windows in the intermediate plate, each one representing a different hourly rate the total wages due for that day can be directly read. A different set of windows is provided for deduction of a certain amount of time, such as one-half hour for lunch time, so that this is automatically done without separate calculations.

The third and smallest plate has a scale which when aligned properly with scales of the other plates indicate hours of overtime and when aligned again may be rotated with the intermediate plate a predetermined amount to automatically add overtime wages to regular wages for indication in one of the windows provided.

DESCRIPTION OF THE DRAWINGS

FIGURE 1 is a plan view of one embodiment of the invention;

FIGURE 2 is a partial plan view of the lower plate of the embodiment shown in FIGURE 1;

FIGURE 3 is a partial plan view of the intermediate plate of the embodiment on FIGURE 1;

FIGURE 4 is a partial plan view of the upper plate of the embodiment of FIGURE 3;

FIGURE 4A is a partial plan view of a modified embodiment of the upper plate;

FIGURE 5 shows a portion of one embodiment of the invention and detailed projections to illustrate one step in the operation of the device.

FIGURE 6 is another partial plan view with detailed projections showing a further step in the operation of the device; and FIGURE 7 is still another partial plan view with detailed projections showing a still further step in the operation of the device.

DESCRIPTION OF THE PREFERRED EMBODIMENT

Referring first to FIGURE 1 of the drawings, a preferred embodiment of the invention comprises a lower plate 1, a smaller diameter intermediate plate 2 thereabove, and the smallest diameter upper plate 3. These plates which can be conveniently made of plastic or the like are mounted for independent rotation about a common axis by means such as pin 4.

Referring also now to FIGURE 2, lower plate 1 has several circular scales of various diameters. The outermost scale, called the starting time scale 10, is graduated in hours and minutes for a twelve hour period. As can be seen from FIGURE 1, this scale is not covered by intermediate plate 2 but its graduation marks intersect the outside diameter of intermediate plate 2. An index mark 15 is provided at the figure 12:00 on scale 10. Its use will be seen subsequently. The next circular scale 11 called the working hours scale is a thirteen hour scale graduated in hours and minutes.

Then, there is a series or set of ten circular scales 12 with numbers lying on radial lines representing a certain hourly rate multiplied by a certain number of working hours. The innermost nine of these scales have alternate rightside-up and upside-down numbers when reading them in one direction of generation. This arrangement reduces over-all size as will be seen more clearly later. More inwardly of this set of scales is another set of nine scales 13, each figure also representing a certain hourly rate multiplied by working hours. All of these numbers face in the same direction. Both of these sets of scales 12 and 13 may be called daily wage scales.

The innermost scale of plate 1 is a twelve hour scale 14 graduated in tenths of an hour rather than minutes and corresponds with starting time scale 10. This scale may be very helpful for use with time clocks which punch time by tenths of hours rather than minutes.

Referring now also to FIGURE 3, intermediate plate 2 will be described in detail. It is preferably made of an opaque material so that it covers almost all of the numbers of lower plate 1. A quitting time scale 20 is provided on its outer edge graduated in hours and minutes for a twelve hour period. Near the center of intermediate plate 2, a transparent ring 21 is provided so that it lies directly over inner starting time scale 14 of plate 1. Adjacent to ring 21 is an inner quitting time scale 22 also graduated in tenths of an hour for a twelve hour period and corresponding with scale 20.

There are three groups of window slots, a, b, and c (see FIGURE 1), spirally arranged at specific points in intermediate plate 2. In each of these groups there are three slots on the same diameter. The outer diameter slots 24 of group (a) lie directly over working hour scale 11 of the lower plate and indicate total hours worked as will be better understood subsequently. The farthest counter-clockwise of these three slots represents hours worked with no time off between starting and quitting time. The intermediate slot represents hours worked with thirty minutes off, such as lunch break, between starting and quitting time. The farthest clockwise slot represents hours worked with an hour off between starting and quitting time.

Slot groups (a) and (b) lie directly over wage scale 12 of lower plate 1. Group (a) registers with one set of numbers and group (b) registers with the alternate set of numbers. Slot group (c) lies directly over wage scale 13 of lower plate 1. Each set of three slots lying on the same diameter in groups (a), (b) and (c) corresponds with calculated wages for a different hourly rate. In each set of three slots, as in outer slots 24, the farthest counter-clockwise slot represents no time off; the next, thirty minutes off; and the farthest clockwise, one hour off. Thus, for the particular embodiment shown daily wages can be calculated for twenty-eight different hourly rates. Of course, the invention could be adapted for any number, more or less than this. Also periods of off time, other than thirty minutes and an hour, can be easily provided.

It should be now obvious that the alternate numbers of lower plate scale 12 and slot groups (a) and (b) reduce the overall size of the calculator device. By overlapping these scales, the diameter required is reduced. The spiral arrangement of the window slot groups (a), (b) and (c) also reduces over-all size by permitting closer spacing of circular scales 12. These principles could also be used in other variations of the invention.

Referring also now to FIGURE 4, upper plate 3 will be described. This plate, which is transparent, has a smaller diameter than both plates 1 and 2. It has one scale 30 on its periphery, graduated in hours and minutes for a period of six hours. An index mark 31 is provided to cooperate with index mark 15 of lower plate 1 in a manner to be subsequently described. Scale 30 is called the overtime scale and is for the purpose of calculating extra pay for overtime work. The particular scale shown is for time and one-half overtime pay. Of course, this plate can be adapted for other overtime rates.

As shown in FIGURE 4A upper plate 3 could be formed so as to provide magnification of the numbers therebelow. Two such constructions shown in FIGURE 4A could be easily made of clear plastic. The first, represented by dotted lines, is characterized by radial ridges formed by inclined planes 50, 51 intersecting in radial lines 52 so that the ridges are narrower near the center than at the edge.

Another construction, represented by solid lines, is characterized by rounded radial ridges 54 narrowing in width from the edge toward the center. Both of the constructions inherently provide magnification throughout three hundred and sixty degrees to development.

Of course, another plate independent of plate 3 could be provided for this purpose. However, the device would be more bulky, and less economically manufactured.

Referring now to all of the drawings and in particular FIGURES 5, 6 and 7, the manipulation of the device will be demonstrated. Suppose a man begins work at 8:00 A.M. and quits at 5:00 P.M. with thirty minutes off for lunch. To calculate his daily wage, first the quitting time 5:00 is found on scale 20 and plate 2 is rotated until this figure registers with the starting time 8:00 on scale 10 of lower plate 1. (This setting is shown at 40 in FIGURE 5.) Total hours worked will then be shown in the intermediate slot 24, since he had thirty minutes off for lunch. This figure is, of course, 8 hours and 30 minutes. If the worker is to be paid at straight time rates his daily wage can then be determined by looking at the intermediate slot of the set of window slots for a particular hourly rate.

If a worker is to be paid a higher rate for overtime, such as time and a half, this can be automatically added in with the use of upper plate 3. For instance, in the example just stated the worker has worked a total time of 8 hours and 30 minutes. By moving index 31 on scale 30 into alignment with 8:30 (total hours worked) on scale 20 (this setting is shown at 41 in FIGURE 5), the number of extra minutes to be added to 8 hours and 30 minutes can be read on scale 30 opposite the normal or straight time working day, in this case 8 hours. Thus, 15 minutes is read. (This setting is shown at 42 in FIGURE 5.) Now if 15 minutes on scale 30 is aligned opposite 8:15 (8 hour day plus 15 minutes) on scale 20 (this setting is shown at 43 in FIGURE 6), index 31 to 8:45 on scale 20 (this setting is shown at 44 in FIGURE 6), the total number of hours and minutes at regular time rates equivalent to 8 hours at regular rates and 30 minutes at time and a half. Now by rotating both intermediate plate 2 and upper plate 3 together in the direction of the arrow shown in FIGURE 6 until index 31 is aligned with index 15 on lower plate 1 (see setting shown at 45 in FIGURE 7) the total wages due, including overtime, can be directly read through the intermediate window slot of the set of slots for the hourly rate paid.

It can therefore be seen from the foregoing example that by using this simple, economically made device, daily wages due a worker can be easily calculated for a plurality of hourly rates and time off between starting and quitting time. Not only can a regular day be calculated, but overtime too, is easily calculated for direct reading. Of course, many combinations and variations of working time and rates can be solved with the present invention.

Only one embodiment of the invention and one illustrative problem has been described herein. Many variations of the invention and its application may be made by one skilled in the art without departing from the spirit of the invention.

What is claimed is:
1. A hand operated computing device comprising,
   a first plate means having a plurality of unit scale indicia concentrically arranged thereon, the numbers of at least a portion of said unit scale indicia being arranged so that some of the numbers on the same diameter face in one direction and other numbers therebetween on the same diameter face in substantially the opposite direction,
   a second plate means of circular shape overlying said first plate and being independently rotatable about an axis which is coincident with the center of said unit scale indicia, said second plate having a plurality of apertures on diameters corresponding to the diameters of at least a portion of said unit scale indicia, and
   cooperating indicia on said first and second plates which when aligned for a particular setting correlate unit variables expressed by said cooperating indicia and said unit scale indicia for direct indication through said apertures, some of said apertures registering with said some of the numbers on said unit scale indicia while other of said apertures register with said other numbers.

2. The device of claim 1 in which there are at least two groups of said apertures, one group being registerable with said some of the numbers while the other group registers with said other numbers therebetween.

3. The device of claim 2 in which said apertures are arranged on said different diameters in a spiral pattern said one group of apertures being in a right-hand spiral pattern, said other group being in a left-hand spiral pattern.

4. The device of claim 3 in which each of said aperture groups is composed of sets of at least two apertures on the same diameter, one of said apertures being arranged for indicating said correlation of said unit variables and the other being arranged for indicating said correlation of said unit variables less a constant unit multiplied by unit variables expressed by said unit scale indicia.

5. The device of claim 1 and
a third plate of circular shape being independently rotatable about said axis, said third plate being completely transparent throughout except for a unit indicia on its periphery, and being alignable with said cooperating indicia and being adapted to rotate with said second plate relative to said first plate to permit indication through said apertures of correlation of unit variables expressed by said cooperating indicia, said unit scale indicia and said third plate unit indicia.

6. A hand operated device for computing wages comprising
a first plate having a plurality of concentrically disposed circular scales thereon, the numbers of at least one of said circular scales being arranged so that some of the numbers read along a radial line of said scale from its periphery towards its center and other numbers therebetween read along a radial line of said scale from its center toward its periphery,
a second circular plate overlying said first plate and mounted for independent rotation about a common axis, said second plate being of an opaque material and having a plurality of transparent openings on diameters corresponding to the diameters of at least a portion of said circular scales, and
cooperating scales on said first and second plates which when aligned for a selected setting cause each of said openings to register with numbers on said circular scales representing a particular relationship with said selected setting, some of said transparent openings registering with said some of the numbers on said circular scales while other of said transparent openings register with said other numbers.

7. The device of claim 8 in which said transparent openings are arranged on their different diameters in a spiral pattern, one group of transparent openings forming a right-hand spiral and another group of transparent openings forming a left-hand spiral, one of said groups being aligned with said some of the numbers of said one of said circular scales while the other group is aligned with said other numbers therebetween.

References Cited

UNITED STATES PATENTS

| | | | |
|---|---|---|---|
| 540,184 | 5/1895 | Norris | 235—84 |
| 1,519,253 | 12/1924 | Harper | 235—88 |
| 1,674,157 | 6/1928 | Christopher | 235—78 X |
| 2,424,890 | 7/1947 | Howells | 235—78 |
| 3,152,756 | 10/1964 | Meyerson | 235—78 X |

RICHARD B. WILKINSON, Primary Examiner

STANLEY A. WAL, Assistant Examiner